Oct. 20, 1953   HENRI-ALBERT BONNEL   2,655,850
PLOW
Filed Jan. 20, 1948   4 Sheets-Sheet 4
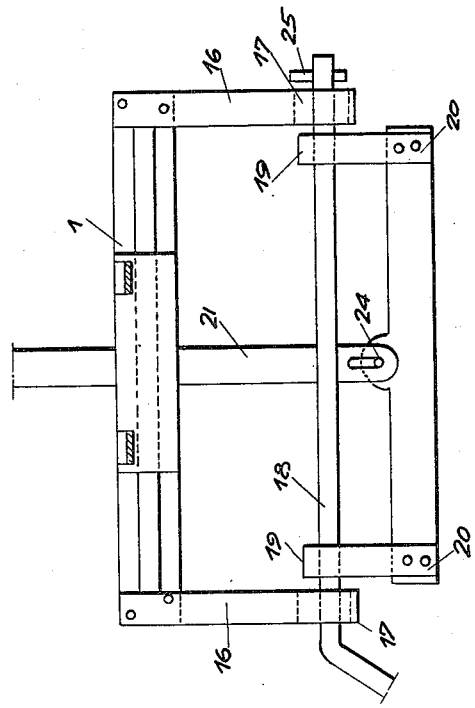
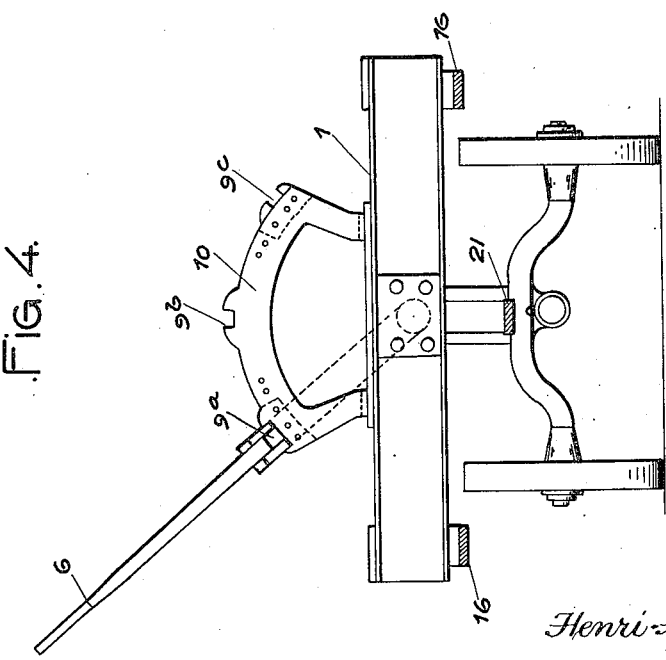
Inventor
Henri-Albert Bonnel,
By Flocks and Simon
Attorneys Patented Oct. 20, 1953

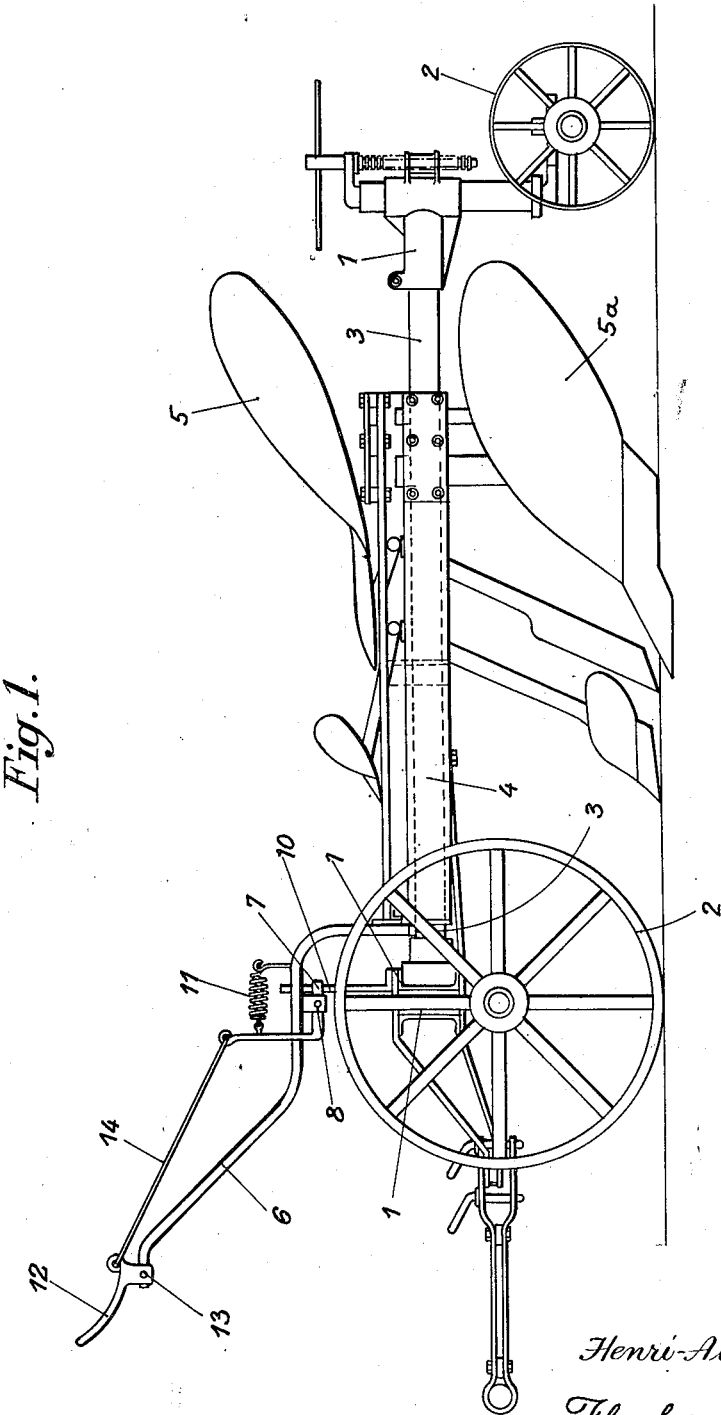

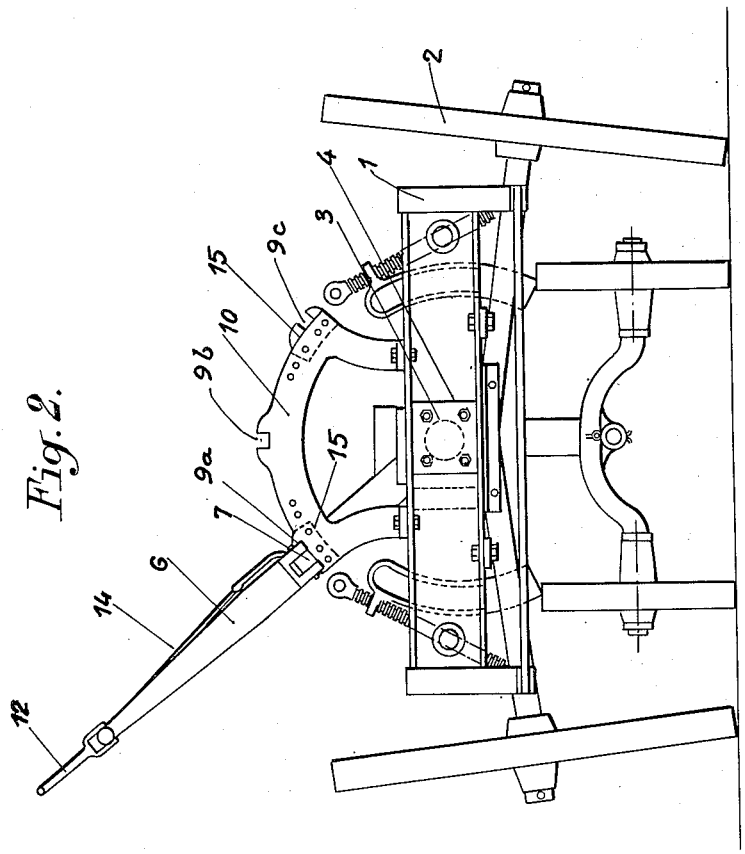

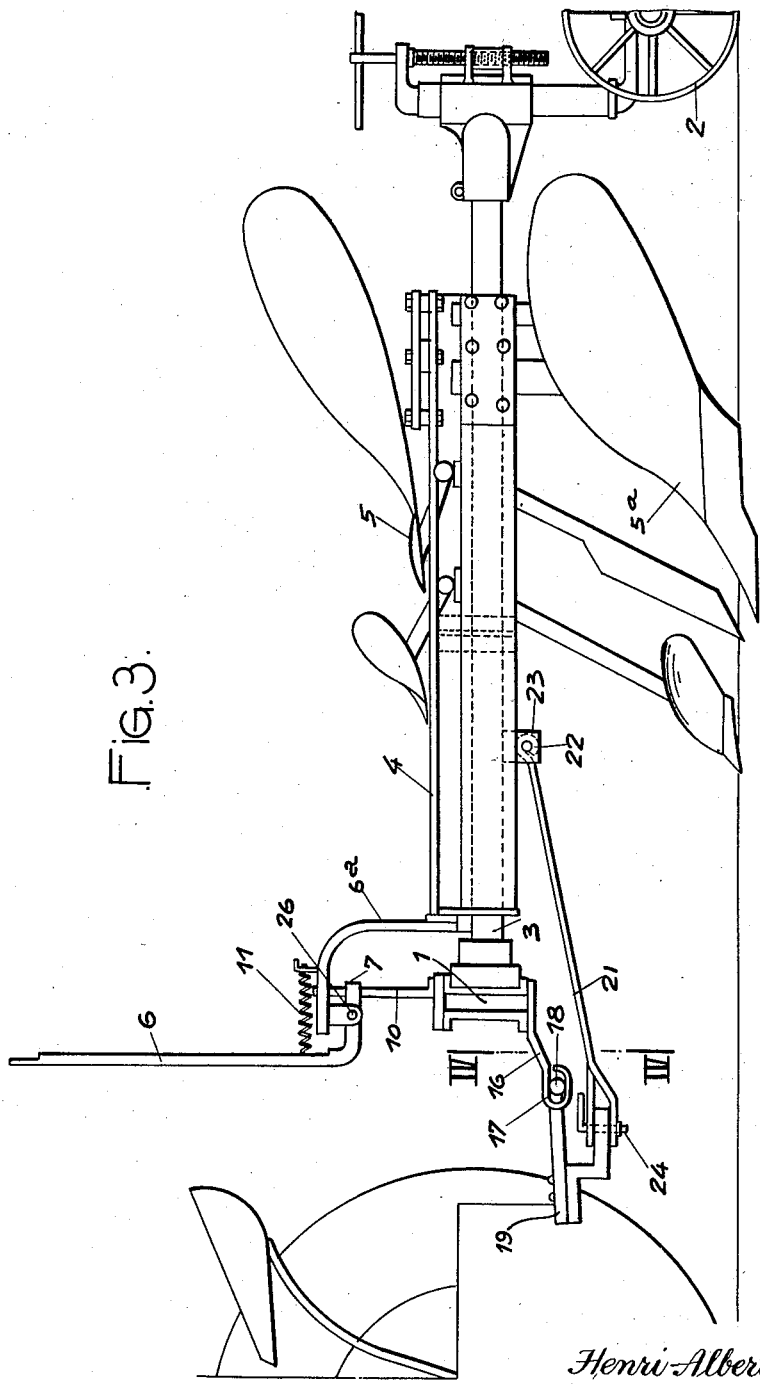

2,655,850

UNITED STATES PATENT OFFICE 2,655,850

PLOW

Henri-Albert Bonnel, Le Neubourg, France

Application January 20, 1948, Serial No. 3,210
In France May 14, 1945

Section 1, Public Law 690, August 8, 1946
Patent expires May 14, 1965

6 Claims. (Cl. 97—26)

The present invention relates to improvements in double action ploughs of the kind comprising a ploughshare or set of ploughshares for ploughing in one direction and a ploughshare or set of ploughshares for ploughing in the opposite direction. These ploughshares or sets of ploughshares are supported by a frame rotatable on the main structure in order to occupy several different positions in one of which it is one of the ploughshares or set of ploughshares which is in position for ploughing whereas the other is raised, an inverted position in which it is this latter which is in position for ploughing, and lastly, an intermediate position in which all the ploughshares are raised.

It is an object of the instant invention to provide a plough of novel construction and easy to operate.

It is a further object of the instant invention to provide a novel relationship between a plough and a tractor.

It is another object to provide a semi-supported plough for mechanical traction.

It is still a further object to provide a tractor involving a three-point coupling system.

Another object is to provide a plough including a pivoting and oscillating rear train facilitating unearthing and swinging movement of the ploughshares.

A further object is to provide a plough including an arrangement for eliminating a mechanical system for raising the ploughshares into inoperative position and which provides for earthing and unearthing at the end of a furrow automatically in response to the movement of the tractor.

Other characteristics and advantages of the present invention will become apparent in the course of the following description, when read in conjunction with the accompanying drawings, illustrating by way of example and diagrammatically an embodiment of an improved plough according to the invention.

In the drawings:

Fig. 1 is an elevational view of the said plough;

Fig. 2 is a corresponding end view but showing another position for the lever.

Fig. 3 is an elevational view of a half-supported plough coupled to a tractor.

Fig. 4 is an end view from the front, with a vertical section along line IV—IV of Fig. 3.

Fig. 5 is a partial top view of the forward cross member of the plough bearing frame, with the shafts and the axial beam for connection to the tractor.

The plough shown in Figs. 1 and 2 includes, in the usual way, a main structure 1 supported by four wheels 2. The rear wheels of the plough, as shown in Fig. 1, are mounted to swivel about a vertical axis as well as a horizontal axis running longitudinally with respect to the plough. A frame 4 on which are secured the ploughshares and other accessories of the plough, can rotate on a central cylindrical beam 3 of said structure. In the example shown, it is assumed that reference is made to a double action plough with one ploughshare, that is comprising a ploughshare 5 for tilling in one direction and a ploughshare 5a for tilling in the opposite direction. It is obvious that several ploughshares could be provided on each side.

In accordance with the invention, the rotation of the ploughshare bearing frame 4, enabling it to be brought into the various positions it must occupy, is operated by an extremely simple device. This device comprises a lever 6 directly secured to the frame 4 and on which it is sufficient to act in order to rotate said frame. This frame may be locked in each of the three positions into which it may be brought, by means of a lock 7 pivoting round an axis 8 carried by the lever 6 itself. The said lock cooperates with slots 9a, 9b, 9c formed in a member 10 of segment shape, secured to the main structure 1. When the said lock engages one of the said slots, through the influence for instance of a spring 11, it locks the frame 4 and, as a result, the ploughshares in the corresponding position. Thus, the slot 9a corresponds to the position of the ploughshares for tilling to the right, the slot 9c, to the position for tilling to the left, and the middle slot 9b, to the position of rest or running on the road, for which neither of the ploughshares is set for tilling.

The said lock 7 may be disengaged from the slot in which it is engaged by means of a handle 12 pivoting at 13 on the free end of the lever 6 and which acts on the lock by means of a flexible transmission 14.

It will immediately be understood that when the driver wishes to change the position of the ploughshare bearing frame 4, he only needs to take hold of the handle 12 to make it first of all swing slightly round its axis 13 (which disengages the lock from the corresponding slot 9a, 9b or 9c) and then move the lever 6 into its new position corresponding to the desired new position of the frame 4. In this new position, the lock 7 automatically engages the corresponding slot 9a, 9b or 9c.

It is thus possible, according to the invention, to obtain a plough of very simple construction and of very easy handling.

The two end slots 9a and 9c, instead of being situated directly on the member 10, may advantageously be supported by members 15 themselves fixed on the member 10 in adjustable positions. This arrangement enables the working position of the ploughshares to be adjusted.

In Figures 3 to 5 there is shown a modified form of embodiment according to which the plough may be very easily transformed into a half-supported plough. According to this embodiment, the forward bearing wheels and their axles are withdrawn from the forward cross member of the plough bearing frame. This withdrawal may be easily carried out by the mere dismantling of parts which can always be reassembled if it is later on desired to reconvert the plough into a drawn plough with four bearing wheels. This reconversion can readily be effected by the user himself.

Two side arms or short shafts 16 are secured to the ends of the forward cross member 1, permanently by means of autogenous welding, for example, or removably by means of bolts. These arms 16 are formed, for instance, by a flat section secured at one end to the lower wings of the beam formed by the cross member 1 and shaped so as to present at their free end a stirrup 17 elongated in a lengthwise direction. The coupling of the plough frame to the tractor is effected by inserting a bar or cross axle 18 both into the stirrups 17 and in the circular bores of each of the stirrups 19 secured at 20 to the rear of the tractor.

The swinging movements of the plough in relation to the linking axle formed by the bar 18 are limited by a longitudinal bar or beam 21 arranged in the vertical longitudinal plane of the plough frame and hinged, on the one hand, around a horizontal axis 22 set in a stirrup 23 mounted on the cylindrical frame beam 3 at a point well to the rear of the forward cross member 1 and, on the other hand, hinged at its other end around a vertical axis 24 at a point in the centre of the coupling system connected to the rear of the tractor. The vertical axis 24 may consist merely of a pin which can readily be withdrawn or inserted. The dismantling of the cross bar 18 can also be readily carried out by withdrawing a cotter pin 25 at one end of said bar, as shown in Fig. 5. The earthing of the ploughshares 5, 5a is controlled by means provided for this purpose on the rear wheel train 2 which is the same as that shown in the first embodiment. It will be seen that with this arrangement, the plough is held well in the furrow while remaining free to shift in relation to the tractor in order to position itself in a vertical direction dependent upon the resultant of the tractive efforts and the reactions borne by the ploughshares, while at work. At the end of a furrow, the elongated stirrup 17 and the vertical pivot 24 allow the plough to make the necessary turn for the continuation of a furrow, such continuation, in view of the reduced length of the plough and tractor, only requiring a limited surface area. When the tractor initiates its turn at the end of a furrow, it causes the plough to pivot horizontally about the vertical support for the rear wheels owing to the rigidity of the coupling system. This horizontal pivoting of the plough automatically causes the ploughshares to swing up to median position when the second frame is unlocked owing to the fact that the heel portion of the ploughshare strikes the unploughed ground. To resume the working position by maintaining the second frame unlocked, the ploughshare strikes the ground and causes the whole frame to swing completely. This system completely eliminates the necessity of a costly system for raising the ploughshares. The above described structure also permits the tractor to maneuver rearwardly without difficulty due to the semi-automatic coupling system and due to the rear pair of wheels which become automatically oriented in the required direction. Driving is thereby facilitated and maneuvering accelerated, thus resulting in gain of time and economy in the consumption of fuel by the tractor engine.

The lever 6 by means of which the ploughshare bearing frame may be swung, in the manner described in the first embodiment, may be raised as shown in Fig. 3 in a vertical plane adjacent to that of the front cross member 1. In the construction shown, the lever 6 is pivoted at 26 on an arm 6a of the rotatable frame 4 and its end forms the catch 7 which engages one of the slots 9a, 9b, 9c of the fixed sector 10 so as to determine the angular position of the frame 4 and the ploughshares. A spring 11 between the arm 6a and the lever 6 recalls the latter into engaging position in the slots 9a, 9b, 9c.

The modifications described apply whatever the number of ploughshares.

Thus, it will be seen that the operation of the plough in accordance with the instant invention is simplified. Further, four-wheeled drawn ploughs in accordance with the invention may be transformed into half supported ploughs in which the front wheels are removed, the frame bearing, in the front, directly on the tractor.

The modifications are notably characterized by the following features, considered separately or in combination:

(a) The forward cross member 1 of the plough frame 4 remains organized in such a way as to permit the dismounting of the front wheels 2 which are merely withdrawn together with their axles, and it is provided with two side arms or shafts 16 rigidly secured at their ends associated with the cross member 1 and at their other ends they are provided with horizontally elongated stirrups 17 through which may pass a rod or cross bar 18 in order to provide a linked connection with the coupling system of the tractor.

(b) The vibrations of the plough as a whole around the joint formed by the cross bar 18 for connection to the tractor, are limited by a beam 21 arranged in the median vertical plane of the plough frame beam 3 and hinged, on the one hand, to a cross axis of the frame beam 3 at a point 22 well behind the forward cross member 1 and, on the other hand, around a vertical axis 24 secured to the tractor at a point below the cross linking bar.

(c) The linking between the plough shafts and the cross bar of the tractor is effected by stirrups 17 which are elongated in a lengthwise direction.

It will be obvious to those skilled in the art that various changes may be made without departing from the spirit of the invention and therefore the invention is not limited to what is shown in the drawings and described in the specification but only as indicated in the appended claims.

I claim:

1. A wheeled plough adapted to be supported at the front end by a tractor and at the rear end by a pair of wheels, comprising a plough frame, a pair of wheels independently carrying the rear end of said frame to transfer the weight of said frame to the rear part of said tractor thereby increasing the traction of said tractor, said pair of wheels being mounted to swivel both about a vertical axis and a horizontal axis running longitudinally with respect to said plough, a second frame for supporting a ploughshare, said second frame being mounted on said first frame for oscillation transversely thereabout, a pair of forwardly extending side arms attached to the front of said first frame, each said side arm having an elongated stirrup at the forward end thereof, a pair of rearwardly extending arms attached to the rear of said tractor, each said arm having a circular stirrup at the rear end thereof, and a cross bar passing through both said elongated stirrups and both said circular stirrups.

2. A plough in accordance with claim 1 in which the distance between said forwardly extending arms and said rearwardly extending arms is such that a slight lateral play is permitted between said tractor and said first frame.

3. A plough in accordance with claim 2 in which the swinging movements of the plough as a whole around the joint formed by the cross bar for connection to the tractor are limited by a beam located in the median vertical plane of said first frame and hinged, on the one end, to a cross axis of the frame at a point well behind the forward end of said first frame and, on the other end, around a vertical axis integral with the tractor at a point below the cross bar.

4. In a wheeled plough adapted to be drawn by a tractor, a plough frame, a pair of wheels independently carrying the rear end of said plough frame to transfer the weight of said frame to the rear part of said tractor thereby increasing the traction of said tractor, a coupling means for coupling the front of the plough frame to the rear of the tractor which comprises a pair of forwardly extending side arms attached to the front of said plough frame, each said side arm having an elongated stirrup at the forward end thereof, a pair of rearwardly extending arms attached to the rear of said tractor, each said arm having a circular stirrup at the rear end thereof, and a cross bar passing through both said elongated stirrups and both said circular stirrups.

5. The device claimed in claim 4 in which the distance between said forwardly extending arms and said rearwardly extending arms is such that a slight lateral play is permitted between said tractor and said frame.

6. The device claimed in claim 5, in which the swinging movements of the plough as a whole around the joint formed by the cross bar for connection to the tractor are limited by a beam located in the median vertical plane of said frame and hinged, on the one end, to a cross axis of the frame at a point well behind the forward end of said frame and, on the other end, around a vertical axis integral with the tractor at a point below the cross bar.

HENRI-ALBERT BONNEL.

References Cited in the file of this patent

UNITED STATES PATENTS

| Number | Name | Date |
| --- | --- | --- |
| Re. 10,839 | Strait | May 31, 1887 |
| 332,301 | Strait | Dec. 15, 1885 |
| 849,575 | Samuels | Apr. 9, 1907 |
| 1,165,267 | McKay | Dec. 21, 1915 |
| 1,410,917 | Hee | Mar. 28, 1922 |
| 1,481,565 | Sellars et al. | Jan. 22, 1924 |
| 2,044,718 | Rutter | June 16, 1936 |
| 2,232,407 | Riesterer | Feb. 18, 1941 |
| 2,239,596 | Doane | Apr. 22, 1941 |
| 2,364,367 | Janke | Dec. 5, 1944 |

FOREIGN PATENTS

| Number | Country | Date |
| --- | --- | --- |
| 58,452 | Austria | Apr. 10, 1913 |
| 875,681 | France | June 29, 1942 |
| 181,731 | Germany | Feb. 28, 1907 |
| 366,798 | Germany | Jan. 13, 1923 |
| 271,983 | Italy | Feb. 25, 1930 |
| 95,463 | Switzerland | July 1, 1922 |